US007478705B2

(12) United States Patent
Schaffhauser et al.

(10) Patent No.: US 7,478,705 B2
(45) Date of Patent: Jan. 20, 2009

(54) ELEVATOR

(75) Inventors: Urs Schaffhauser, Root (CH); Mario Fernandes, Mulhouse (FR); Julien Maury, Emmenbrücke (CH)

(73) Assignee: Inventio AG, Hergiswil NW (CH)

( * ) Notice: Subject to any disclaimer, the term of this patent is extended or adjusted under 35 U.S.C. 154(b) by 0 days.

(21) Appl. No.: 11/199,047

(22) Filed: Aug. 8, 2005

(65) Prior Publication Data

US 2006/0070819 A1 Apr. 6, 2006

(30) Foreign Application Priority Data

Aug. 9, 2004 (EP) .................................. 04405503

(51) Int. Cl.
*B66B 11/08* (2006.01)
*A46B 15/00* (2006.01)
*B21B 45/02* (2006.01)
*B60S 1/28* (2006.01)

(52) U.S. Cl. ....................... 187/266; 187/254; 15/256.6

(58) Field of Classification Search ................. 187/254, 187/266, 414
See application file for complete search history.

(56) References Cited

U.S. PATENT DOCUMENTS

| | | | | |
|---|---|---|---|---|
| 651,236 | A * | 6/1900 | Corcoran | 187/250 |
| 5,566,785 | A * | 10/1996 | Hakala | 187/250 |
| 5,791,011 | A * | 8/1998 | Richter et al. | 15/256.6 |
| 6,722,475 | B2 * | 4/2004 | Miller et al. | 187/266 |
| 2004/0173411 | A1 * | 9/2004 | Silberhorn et al. | 187/277 |
| 2006/0175140 | A1 * | 8/2006 | Kolb et al. | 187/266 |
| 2006/0231347 | A1 * | 10/2006 | Mustalahti et al. | 187/266 |

FOREIGN PATENT DOCUMENTS

| | | | |
|---|---|---|---|
| EP | 1 457 454 | | 9/2004 |
| FR | 2640604 | A1 * | 6/1990 |
| JP | 02295878 | | 12/1990 |
| JP | 05105365 | | 4/1993 |
| JP | 09165165 | | 6/1997 |
| JP | 2003238050 | | 8/2003 |
| WO | WO 9711020 | A1 * | 3/1997 |

* cited by examiner

*Primary Examiner*—Peter M Cuomo
*Assistant Examiner*—Eric Pico
(74) *Attorney, Agent, or Firm*—Fraser Clemens Martin & Miller LLC; William J. Clemens

(57) ABSTRACT

An elevator has deflecting rollers integrated in the car floor. The supporting and driving means is guided in the car floor through a floor channel. A cover serving as protection covers the supporting and driving means running in and running out at the deflecting roller. The hood-shaped cover can be snapped onto the axle of the deflecting roller.

11 Claims, 5 Drawing Sheets

ELEVATOR

BACKGROUND OF THE INVENTION

The present invention relates to an elevator consisting of an elevator car, which car is movable in an elevator shaft, and a counterweight, wherein the elevator car and the counterweight are connected by a supporting and driving means guided over deflecting rollers and the deflecting rollers are integrated in the elevator car or the counterweight, wherein a drive drives the elevator car and the counterweight.

An elevator with a 2:1 cable guidance is shown in the European patent application EP 04004311.9, in which the deflecting rollers of the elevator car are integrated in the car floor or in the counterweight. The supporting and driving means is guided in the car floor through a floor channel. By comparison with a conventional car floor with deflecting rollers arranged underneath (lower blocks), the car floor is overall very low in height, which has a direct effect on the shaft pit depth. The height gained by the car floor can be saved in the shaft pit depth.

A disadvantage of this known equipment is that the deflecting rollers, which are integrated in the elevator car or in the counterweight, together with the supporting and driving means running in represent a substantial risk for maintenance personnel.

SUMMARY OF THE INVENTION

The present invention avoids the disadvantages of the known equipment and provides an elevator installation which is safer for maintenance personnel.

The advantages achieved by the present invention are that the deflecting rollers of the elevator car as also the deflecting rollers of the counterweight do not represent unexpected sources of risk for maintenance personnel. The supporting and driving means (cable, belt) running in and running out at the deflecting roller is covered by the equipment according to the present invention. Moreover, the equipment according to the present invention prevents the supporting and driving means from being able to partly or completely leave the deflecting roller in the case of, for example, excessive accelerations or decelerations. Moreover, the equipment according to the present invention prevents dirt and/or objects from being able to get between deflecting rollers and supporting and driving means. The equipment according to the present invention is inexpensive to manufacture and can be mounted in a simple manner.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
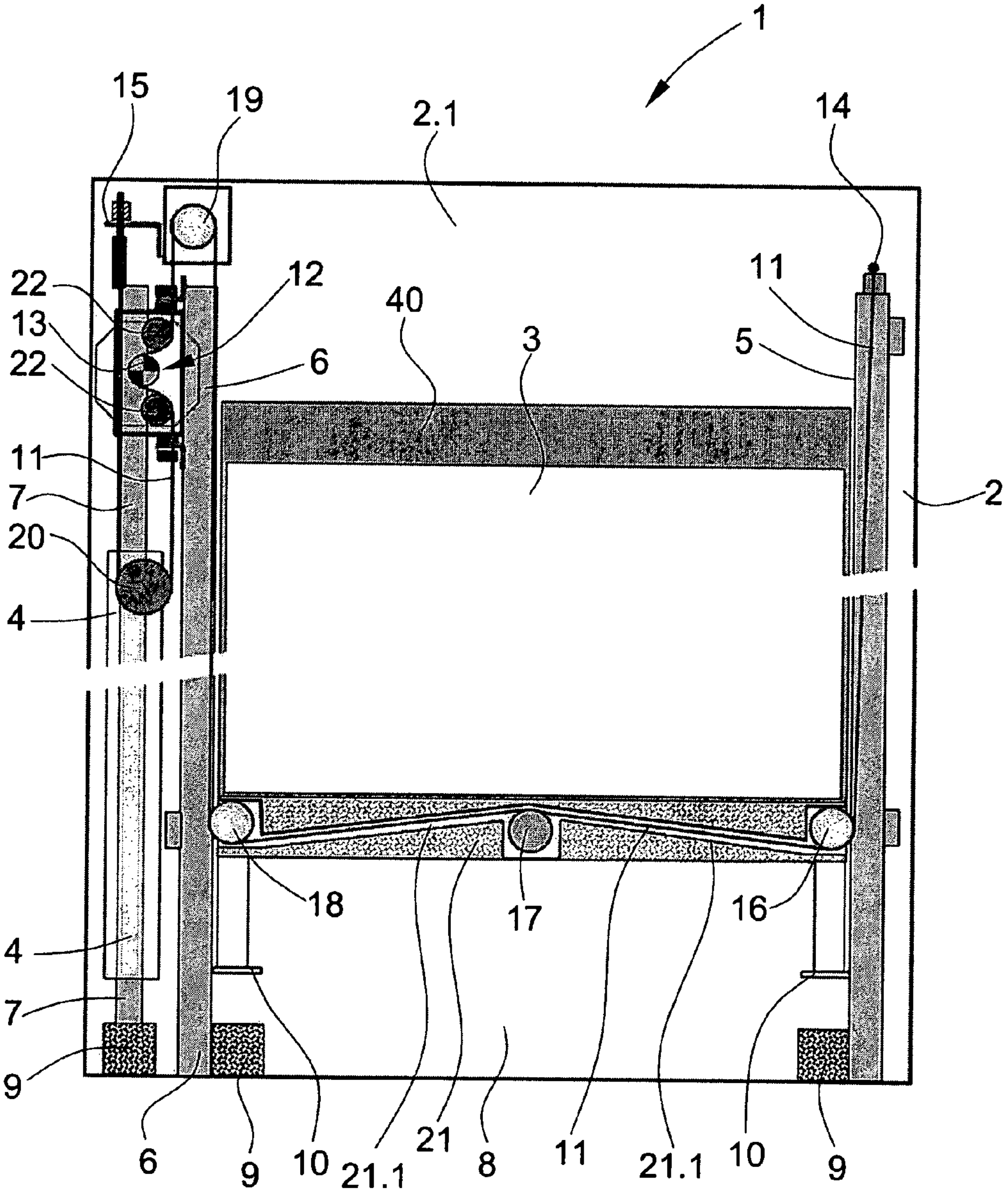
FIG. 1 is a cross-sectional elevation view of an elevator with deflecting rollers integrated in the floor of the elevator car.

An elevator denoted by 1 and consisting of an elevator car 3, which is movable in an elevator shaft 2, and a counterweight 4 is illustrated in FIG. 1. The elevator car 3 is guided by a first guide rail 5 and a second guide rail 6. The counterweight 4 is guided by a third guide rail 7 and a fourth guide rail (not illustrated). The guide rails are supported in a shaft pit 8, wherein the vertical forces are conducted into the shaft pit 8. The guide rails 5, 6, 7 are connected with the shaft wall by brackets (not illustrated). Arranged in the shaft pit 8 are buffers 9 on which buffer plates 10 of the elevator car 3 or the counterweight 4 can set down.

A belt 11, for example a cogged belt or a belt with longitudinal ribs (wedge ribbed belt), with a 2:1 belt guide, is provided as supporting and driving means. If a mechanical linear drive 12, which is arranged at the second guide rail 6, for example in a shaft head 2.1, advances the belt 11 by means of a drive wheel 13 through one unit, the elevator car 3 or the counterweight 5 moves by half a unit. One end of the belt 11 is arranged at a first cable fixing point 14 and the second end of the beli 11 is arranged at a second cable fixing point 15. The belt 11 is guided over a first deflecting roller 16 with a roller axle 16.1 (FIG. 1*a*), over a profile roller 17, over a second deflecting roller 18 with a roller axle 18.1 (FIG. 1*a*), over a third deflecting roller 19, over the drive wheel 13 and over a fourth deflecting roller 20. The first deflecting roller 16, the second deflecting roller 18 and the profile roller 17 are integrated in the floor 21 of the elevator car 3, wherein the belt runs in a floor channel 21.1. The first deflecting roller 16, the second deflecting roller 18 and the profile roller 17 can also be integrated in the roof of the elevator car 3, wherein the belt runs in a roof channel. As in the example of the embodiment shown in FIG. 1*a,* the profile roller 17 can be omitted. The profile roller 17 has a toothing corresponding with the toothing of the belt 11 or a grooving corresponding with the longitudinal ribs of the belt 11. The first deflecting roller 16 and the second deflecting roller 18 guide the belt 11 on the untoothed side by means of flanges arranged at end faces. The third deflecting roller 19 arranged at the second guide rail 6 is engaged by its toothing with the toothed side of the belt 11 and has a brake for normal operation. The drive wheel 13 is engaged by its toothing with the toothed side of the belt 11. Diverting rollers 22 of the linear drive 12 increase the angle of wrap of the belt 11 at the drive wheel 13. The motor or motors for the drive wheel 13 is or are not illustrated. The fourth deflecting roller 20 is arranged in the counterweight and is comparable in construction with the first deflecting roller 16 or with the second deflecting roller 18.

Figure 1A:
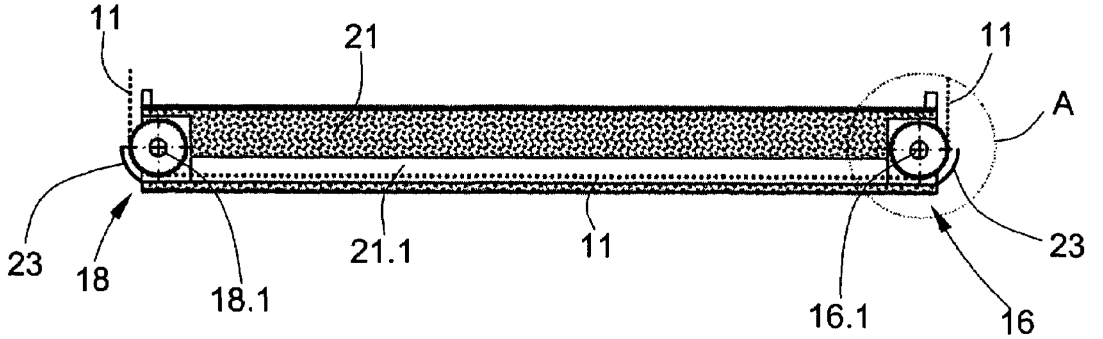
FIG. 1*a* is a cross-sectional view of the car floor shown in FIG. 1 with deflecting rollers and the equipment according to the present invention.

As shown in FIG. 1*a,* the deflecting rollers 16, 18 are each provided with a cover 23, which is schematically illustrated. The deflecting roller 20 of the counterweight can also be provided with a cover 23.

Figure 2:
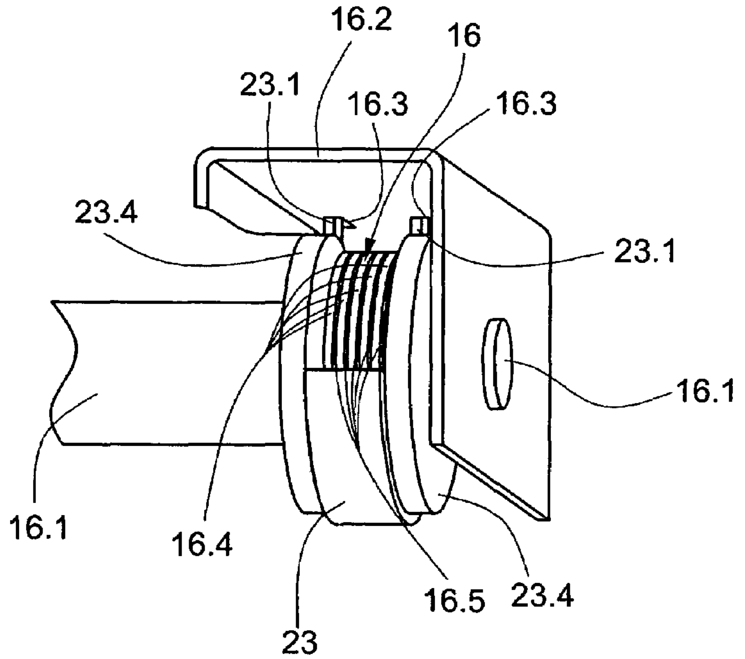
FIG. 2 is an enlarged perspective view of one of the deflecting rollers shown in FIG. 1*a* with the equipment according to the present invention.

A detail view "A" of FIG. 1*a* is shown in FIG. 2 wherein the deflecting roller 16 with the cover 23 is in perspective. The roller axle 16.1 is supported by a support formed as a U-shaped profile member 16.2. Openings 16.3, in which the lugs 23.1 of the side panels 23.4 detent, are provided at the U-shaped profile member 16.2. The deflecting roller 16 has ribs 16.4 and grooves 16.5. Longitudinal ribs of the belt 11 pass between the ribs 16.4 and in the grooves 16.5 of the deflecting roller 16.

Figure 3:
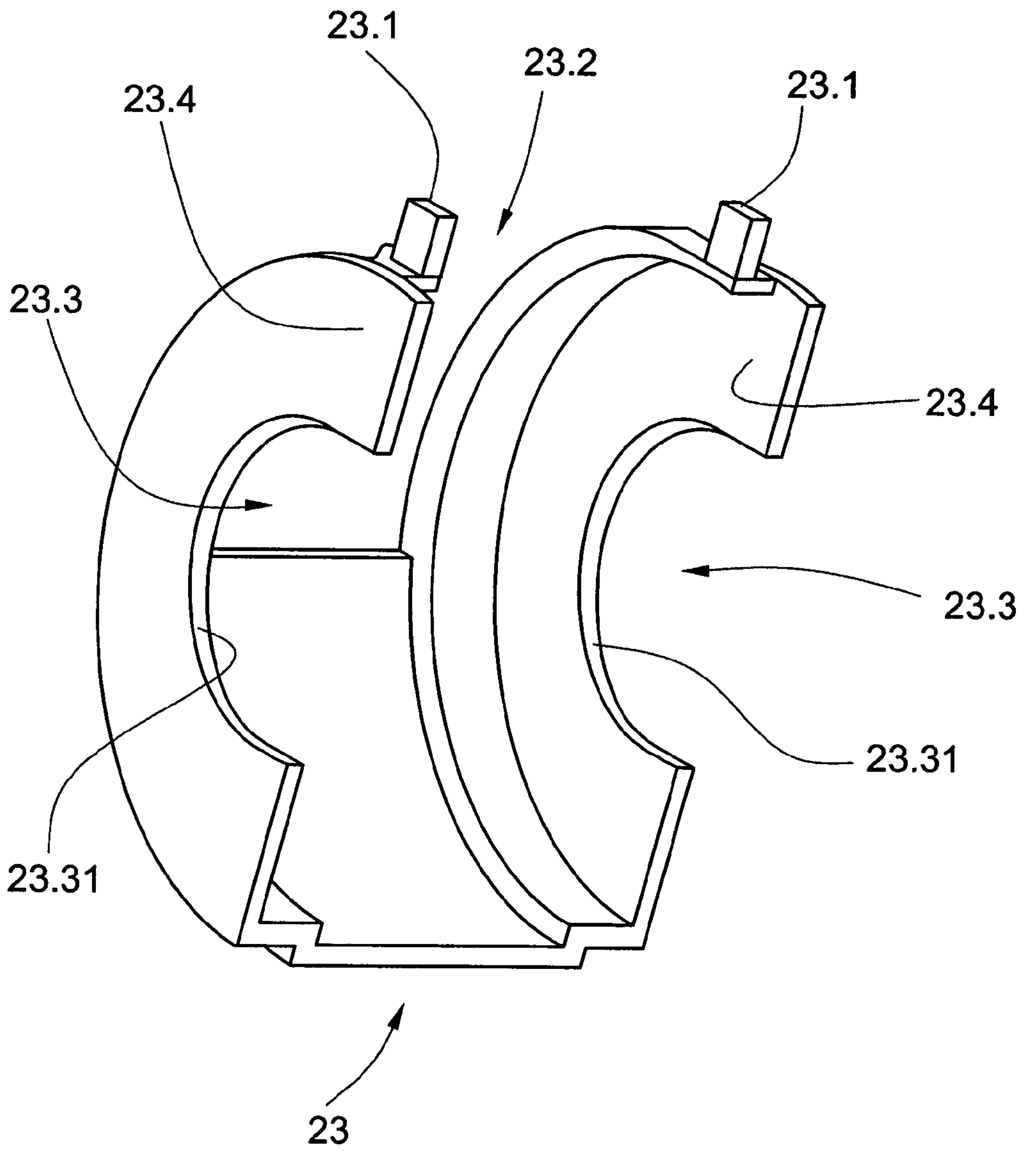
FIG. 3 is a perspective view of the cover shown in FIG. 2.

FIG. 3 is a perspective illustration of the hood-shaped cover 23, which has an arcuate wall 23.5 extending between and connecting the spaced side panels 23.4. The wall 23.5 has a first recess 23.2 and the panels 23.4 have second recesses 23.3. As viewed from the side panels 23.4, the cover has a C-shaped profile. The first recess 23.2 serves for entry and exit of the supporting and drive means 11. The cover 23 fits by the second recesses 23.3 on the roller axle 16.1. The second recesses 23.3 are circular, wherein the arc 23.31 embraces the axles 16.1 by more than 180°. For mounting in a tool-free manner the cover 23 is introduced at the lugs 23.1 according to FIG. 5 into the opening 16.3 of the U-shaped profile member 16.2 and resiliently detented to the roller axle 16.1 by a rotational movement. With the arrangement of the cover 23 at the roller axle 16.1 the correct spacing of the cover 23 relative to the deflecting roller 16, 18, 20 or relative to the supporting and drive means 11 is guaranteed in every case.

Figure 4:
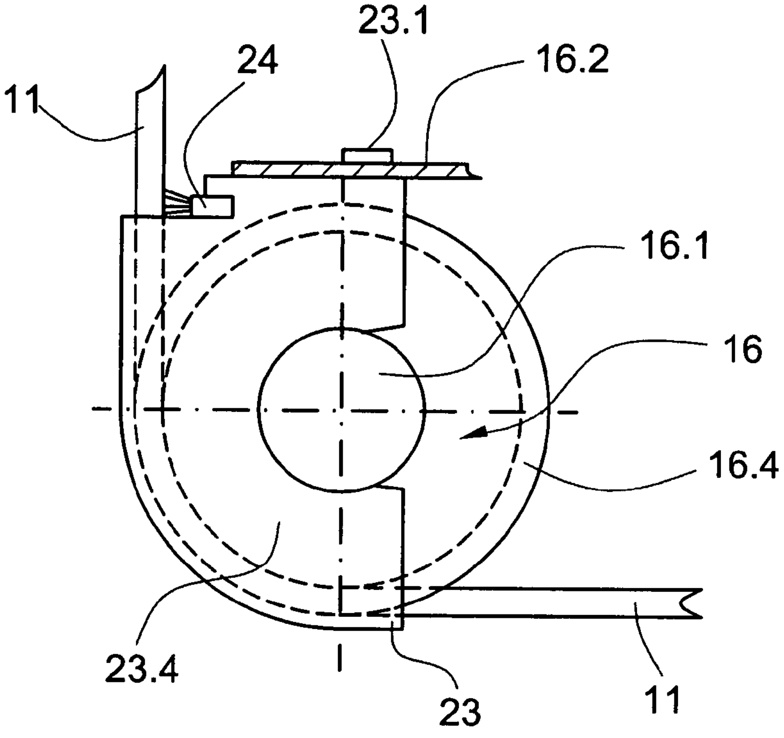
FIG. 4 is a sectional view perpendicular to the axis of the deflecting roller shown in FIG. 2.

FIG. 4 shows a section at right angles to the roller axle 16.1. The arcs of the side panels 23.4 embrace the axle 16.1 by more than 180° and ensure a resilient detenting of the cover 23 with the roller axle 16.1. A brush 24 prevents material (such as objects, articles of clothing, body parts or dirt, etc.) from being able to pass between the deflecting rollers 16, 18, 20 and the supporting and drive means 11. The brush 24 extending at least over the width of the supporting and drive means 11 can be arranged at the cover 23 or at the support 16.2.

Figure 5:
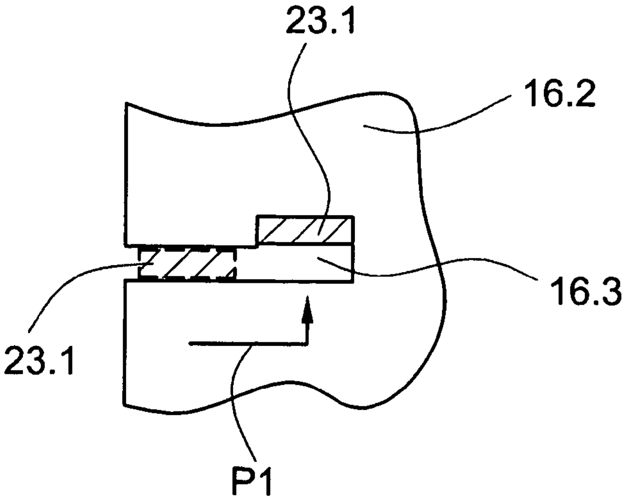
FIG. 5 is a fragmentary plan view of details of the cover of FIG. 4.

FIG. 5 shows the introduction and detenting of the lugs 23.1 in the openings 16.3 of the U-shaped profile member 16.2. It is shown by a dashed line how the lug 23.1 is introduced into the opening 16.3. The opening 16.3 has, at the end, a widening in which the lug 23.1 moves under the effect of the spring action of the side panel 23.4. An arrow P1 symbolizes the introducing and detenting process of the lug 23.1.

Figure 6:
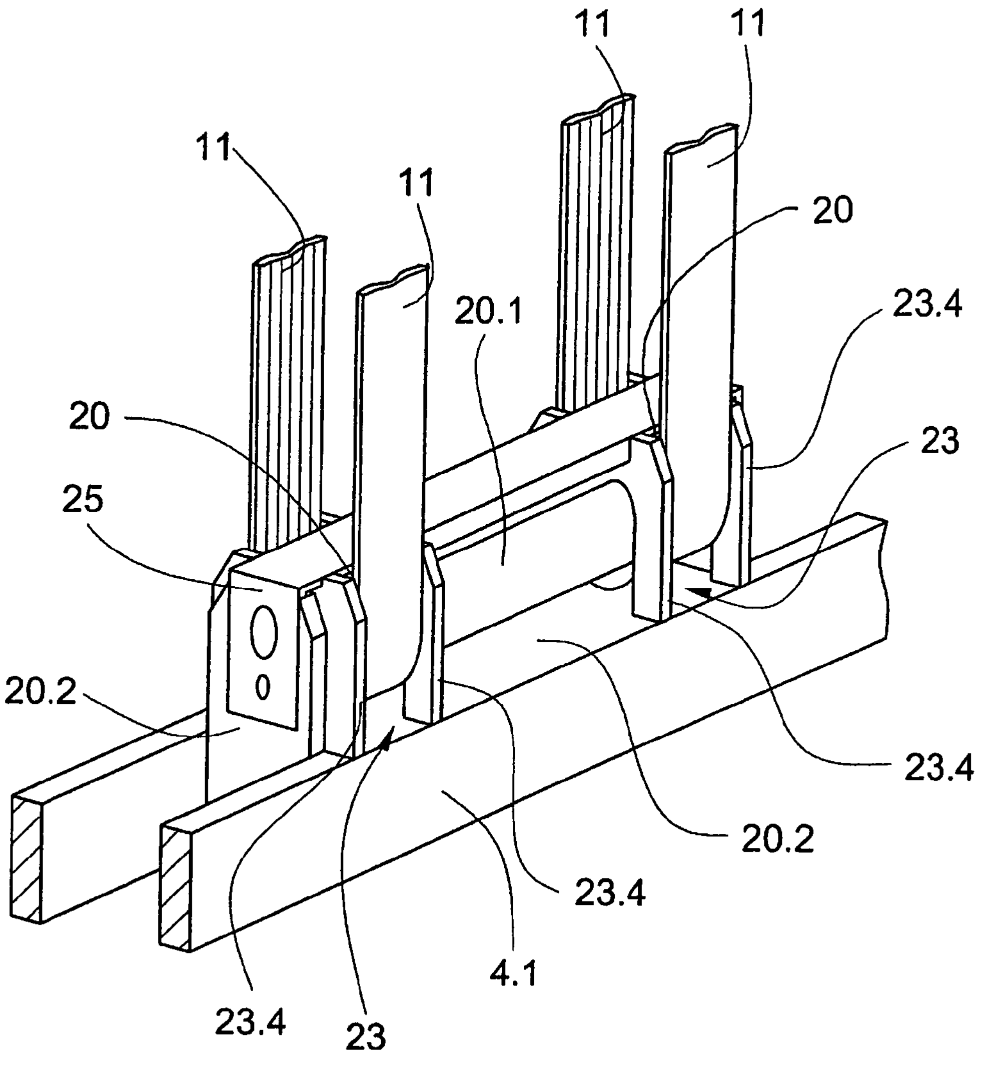
FIG. 6 is a perspective view showing deflecting rollers, which are provided with covers, of the counterweight according to the present invention.

FIG. 6 shows the deflecting rollers 20, which are provided with the hood-shaped covers 23, of the counterweight 4, wherein the deflecting rollers 20 are arranged at a yoke 4.1 of the counterweight 4. Doubly guided belts 11, which are guided over the deflecting rollers 20, are provided as supporting and drive means. The roller axle 20.1 and a bracket 25 are supported by a support 20.2 arranged at the yoke 4.1. A respective cover 23, the arcs of the side panels 23.4 of which embrace the roller axle 20.1 by more than 180°, is provided for each roller 20. The ends of the side panels 23.4 are provided with lugs which enter into recesses of the support 20.2. The covers 23 are mounted in a tool-free manner and secured by the bracket 25.

The cover 23 also serves as protection against jumping off tracks. A belt 11 displaced by half a longitudinal rib pitch grazes against the side panels 23.4 and is forced by these back into its original position. A belt 11 becoming slack cannot, by virtue of the cover 23 according to the present invention, leave the roller groove 16.5.

The cover 23, which in mounting is placed under mechanical stress, cannot generate any rattling noises. The cover 23 can be centered on the roller axle 16.1 in a simple manner. Grooves in which the side panels 23 fit at the arcs 23.31 can also be provided at the roller axle 16.1, 20.1.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An elevator including an elevator car and a counterweight that are movable in an elevator shaft and are connected by a supporting and driving means comprising:

at least one deflecting roller integrated in the elevator car or in the counterweight and engaged by the supporting and driving means; and a cover mounted adjacent said at least one deflecting roller and covering a portion of the supporting and driving means engaging said at least one deflecting roller, said cover including an arcuate wall extending between and connecting a pair of side panels, said cover not contacting the supporting and driving means, said arcuate wall covering a portion of the supporting and driving means, and said arcuate wall and said pair of side panels within a close proximity of said at least one deflecting roller thereby preventing the supporting and driving means from completely disengaging from said at least one deflecting roller.

2. The elevator according to claim 1 including means for mounting said cover at said at least one deflecting roller in tool-free manner.

3. The elevator according to claim 1 wherein said cover is C- shaped in profile and fits on an axle of said at least one deflecting roller

4. The elevator according to claim 1 wherein said cover includes a pair of lugs engaging an opening at a support of said at least one deflecting roller and said cover has recesses formed therein which fit on an axle of said at least one deflecting roller.

5. The elevator according to claim 4 wherein said recesses are shaped to conform to a surface of said axle.

6. The elevator according to claim 1 including a brush extending at least over a width of the supporting and driving means to prevent material from entering between said at least one deflecting roller and the supporting and driving means, said brush being mounted adjacent said at least one deflecting roller and said cover.

7. The elevator according to claim 6 wherein said brush is mounted on said cover or a support for said at least one deflecting roller.

8. A method of improving the safety of an elevator having an elevator car and a counterweight movable in an elevator shaft and connected by a supporting and driving means guided over at least one deflecting roller comprising the steps of:

a. integrating the at least one deflecting roller in one of the elevator car and the counterweight;

b. providing a cover having an arcuate wall extending between and connecting a pair of side panels and mounting the cover to a portion of the supporting and driving means engaging the at least one deflecting roller, the cover not contacting the supporting and driving means, the arcuate wall covering a portion of the supporting and driving means, and the arcuate wall and the pair of side panels within a close proximity of the at least one deflecting roller thereby preventing the supporting and driving means from completely disengaging from the at least one deflecting roller; and c. detenting the cover to the at least one deflecting roller.

9. The method according to claim 8 including performing said step c. in a tool-free manner.

10. The method according to claim 9 including providing an opening in a support for the at least one deflecting roller, providing a lug on the cover, and performing said step c. by engaging the lug in the opening.

11. An elevator including an elevator car and a counterweight that are movable in an elevator shaft and are connected by a supporting and driving means comprising:

a deflecting roller integrated in the elevator car or in the counterweight and engaged by the supporting and driving means;

a cover mounted adjacent said deflecting roller and covering a portion of the supporting and driving means engaging said deflecting roller, said cover not contacting the supporting and driving means, and said cover within a close proximity of the at least one deflecting roller thereby preventing the supporting and driving means from completely disengaging from said deflecting roller; and said cover including a pair of Jugs engaging an opening at a support of said deflecting roller and said cover having recesses formed in a pair of side panels which fit on an axle of said deflecting roller, each said side panel partially covering an adjacent side of said deflecting roller.

* * * * *